United States Patent [19]

Lin et al.

[11] Patent Number: 5,534,563

[45] Date of Patent: Jul. 9, 1996

[54] SILICONE SEALANTS

[75] Inventors: Chiu-Sing Lin, Schenectady; John J. Dziark, Ballston Spa, both of N.Y.

[73] Assignee: General Electric Company, Waterford, N.Y.

[21] Appl. No.: 189,537

[22] Filed: Jan. 31, 1994

[51] Int. Cl.⁶ ............................................. C08K 5/41
[52] U.S. Cl. .................. 523/122; 524/172; 524/588; 524/744; 524/863; 524/864
[58] Field of Search .................. 523/122; 524/172, 524/588, 744, 863, 864

[56] References Cited

U.S. PATENT DOCUMENTS

| | | | |
|---|---|---|---|
| 3,035,016 | 5/1962 | Bruner | 260/46.5 |
| 3,077,465 | 2/1963 | Bruner | 260/46.5 |
| 3,334,067 | 8/1967 | Weyenberg | 260/46.5 |
| 4,247,442 | 1/1981 | Shimizu et al. | 524/83 |
| 4,613,373 | 9/1986 | Umeno et al. | 106/18.3 |

FOREIGN PATENT DOCUMENTS 0034877A 9/1981 European Pat. Off. .
01139513A 6/1989 Japan .

*Primary Examiner*—Melvyn I. Marquis
*Assistant Examiner*—Karen A. Dean

[57] ABSTRACT

The present invention relates to acetoxy, ketoximo, and alkoxy silicone sealants suitable for use in various sealant applications and additionally food contact applications comprising di-iodomethyl-para-tolylsulfone and having physical properties improved thereby.

11 Claims, No Drawings

SILICONE SEALANTS

FIELD OF THE INVENTION

The present invention relates to acetoxy, ketoximo, and alkoxy silicone sealants suitable for use in various sealant applications and additionally suitable for food contact applications having improved physical properties.

BACKGROUND OF THE INVENTION

Organopolysiloxane room temperature vulcanizable (RTV) compositions that are stored under anhydrous conditions will cure upon exposure to water or water vapor at room temperature to yield elastomers. These RTV compositions are prepared by mixing diorganopolysiloxanes having reactive end groups with organosilicon compounds that possess at least three hydrolyzably reactive moieties per molecule. The known RTV compositions are widely used as elastic sealing materials for applications involving the gaps between various joints such as the gaps between the joints of building materials, the joints between structural bodies and building materials in buildings, between the bathtub and wall or floor, cracks on tiles in bathrooms, gaps in the bathroom such as those around the washbasin and those between the washbasin supporting board and the wall, gaps around the kitchen sink and the vicinity, between panels in automobiles, railroad vehicles, airplanes, ships, gaps between prefabricated panels in various electric appliances, machines, and the like. Room temperature vulcanizable silicone sealants thus may be utilized in a wide variety of caulking and sealing applications.

These sealant silicones gradually lose their attractive appearance because of dust and other foreign materials adhering to the surface of the sealant. These adherent materials which consist variously of grime, soaps, detergents, and foods provide nutrients for the growth of surface micro-organisms that further deteriorate the appearance of the sealant, even though the sealant itself is not a nutrient for these micro-organisms. These micro-organisms frequently exhibit colors other than that imparted to the sealant by the use of various pigments, tints and coloring agents, and consequently the sealant suffers a further loss in desirable appearance characteristics.

As a caulking material these sealants are frequently filled with finely divided inorganic materials which may be either reinforcing or non-reinforcing. Reinforcing fillers may be fumed silica, precipitated silica, hydrophobicized precipitated silica, hydrophobicized fumed silica, carbon black, titanium dioxide, ferric oxide, aluminum oxide, and other metal oxides. Non-reinforcing fillers may be calcium carbonate, diatomaceous earth, calcium silicate, zirconium silicate, talc, and bentonite. Fibrous materials such as asbestos, glass fibers, or organic fibers are also useful fillers. The amount of filler used in an RTV composition is selected as desired so as to not interfere with the purposes of the instant invention.

When it is anticipated that these sealant materials will be exposed to conditions that will tend to degrade performance or appearance over a period of time, these sealants are frequently stabilized against such a deterioration by the addition of small quantities of protective additives such as UV stabilizers, anti-oxidants, fungicides, and the like. These additives tend to complement the physical property profile of the sealant by adding additional desirable properties, e.g. resistance to photocatalytic degradation, oxidation (flame retardants), and attack by fungi.

Depending upon the chemical composition of the additive, the application of the sealant containing a particular additive may be restricted to certain types of end uses. For example, sealants containing the fungicide 10, 10'-oxybisphenoxarsine (OBPA) are limited to applications that do not involve food contact. OBPA is highly toxic both by inhalation and by ingestion. It is typically incorporated into the sealant formulation as a dispersion in one of the silicone fluids that are combined to prepare the sealant.

The incorporation of fungicides and mildewstats in sealants is generally necessary because of the moist environments in which these sealants are typically used. The fungicides and mildewcides generally employed in silicone sealants are employed because they possess properties that are toxic to certain micro-organisms that tend to grow in the environment where the sealant is used. Frequently this toxicity extends to the higher vertebrates and thus the application of these sealants is limited to uses where there is little or no risk of danger to human health. Consequently it is desirable to utilize fungicides and mildewstats that are more selective for micro-organisms, i.e. toxic to micro-organisms and not to humans. Such more selective fungicides and mildewstats may be employed in silicone based sealants and utilized in a wider variety of sealant applications because they are less restricted in their fields of use because they should possess little or no toxicity to humans.

While arsenic containing silicone sealants have generally found both widespread and safe application in a variety of kitchen appliances, the consuming public is generally reticent towards their use where food contact or eating utensil contact might conceivably result in contamination. Thus there is a preference on the part of the consuming public for appliances such as dishwashers, refrigerators, freezers and the like that utilize sealants that do not contain toxic elements such as arsenic.

Other more selective fungicidal or anti-microbial materials may render sealant compositions suitable for broader applications. One such more selective compound, di-iodomethyl-para-tolylsulfone has been cleared by the United States Food and Drug Administration (FDA) for use in food contact applications as an ingredient in resinous and polymeric coatings. Thus a sealant containing di-iodomethyl-para-tolylsulfone may be used in conventional sealant applications where an arsenic fungicide containing sealant might be employed or it may be used where contact with food is involved. This broader field of application may result in the use of silicone sealants containing di-iodomethyl-para-tolylsulfone in food processing applications such as commercial kitchens, bakeries and meat processing or packing, particularly since di-iodomethyl-para-tolylsulfone has already been cleared by the U.S. FDA for food contact applications in resins or polymers, viz. sealants.

SUMMARY OF THE INVENTION

A silicone composition comprising a sealant selected from the group consisting of acetoxy, ketoximo, and alkoxy sealants and di-iodomethyl-para-tolylsulfone in an amount ranging from about 0.01% by weight up to about 2.00% by weight incorporated in said sealant whereby, said sealant has improved physical properties.

DETAILED DESCRIPTION OF THE INVENTION

The present invention is based on the discovery that acetoxy, ketoximo, and alkoxy silicone sealants incorporating di-iodomethyl-para-tolylsulfone as a fungicidal, mildewcidal, fungistatic, or mildewstatic compound possess unexpectedly improved physical properties such as tensile strength and a greater percent elongation. The level of incorporation of the di-iodomethyl-para-tolylsulfone ranges from about 0.01% by weight to about 2.00% by weight, more preferably from about 0.01% by weight to about 0.50% by weight, and most preferably from about 0.10% by weight to about 0.50% by weight.

In general, silicone sealants consist essentially of:

(A) an organopolysiloxane having the general formula

HO(RR'SiO)$_x$H wherein R and R' are substituted or unsubstituted monovalent hydrocarbon radicals and may be identical or different where x has a value such that the viscosity of the organopolysiloxane is about 1,000 to 200,000 centipoise at 25° C. A portion of the hydroxyl groups may be replaced by other reactive end groups or endstoppers such as organoketoxime groups, carboxyl groups, acetoxy groups, RNH-groups, (where R is as previously described), carbamoyl groups, alkoxy groups, alkylalkoxy groups, or arylalkoxygroups;

(B) an organosilicon compound having at least three hydrolyzable moieties per molecule having variously the following formulae:

$R_aSi(ON=CR_2)_{4-a}$,
$R_aSi(OR)_{4-a}$,
or
$R_aSi(OCOR)_{4-a}$ where R is the same as defined previously and a is 0 or 1, or their partial hydrolysis products;

$R_aSi(NRR')_{4-a}$ where R is the same as defined previously, R' is hydrogen or the same as R, and a is 0 or 1, or their partial hydrolysis products;

$R_aSi(NCOR)_{4-a}$.
R where R and R' are the same as defined previously, and a is 0 or 1, or their partial hydrolysis products; and that have at least three R$_2$NO- groups per molecule.

Some non-limiting examples of these organosilicon compounds are:

methyltrimethoxysilane, N-aminoethylaminopropyltriethoxysilane,
methyltris(N,N-diethylaminoxy)silane,
methyltris(methylethylketoximo)silane,
methyltris(dimethylketoximo)silane,
vinyltris(methylethylketoximo)silane, vinyltris(dimethylketoximo)silane,
methyltriacetoxysilane, ethyltriacetoxysilane, vinyltriacetoxysilane,
methyltris(N-butylamino)silane, and methyltris(cyclohexylamino)silane,
methyltris(N-methylacetamido)silane.

The organosilicon compounds (B) are generally used in such an amount that at least one mole of the silicon compound exists per gram equivalent of the reactive end groups of the organopolysiloxane (A). More preferably, the organosilicon compound, (B), is generally used in an amount ranging from about 1 to about 15 parts by weight, most preferably (B) is used in amounts ranging from about 1 to about 10 parts by weight relative to component (A).

Component (C) may comprise various additives such as pigments, dyes anti-oxidants, flame retardants, UV stabilizers, adhesion-enhancing agents, thermal stabilizing agents, mildewstats, fungicides, anti-microbials and the like in various combinations ranging from about 0.01% by weight of the sum of components (A) and (B) up to about 20% by weight. In the instant invention, (C) must comprise di-iodomethyl-para-tolylsulfone in an amount ranging from about 0.01% by weight up to about 2.00% by weight.

Component (D) may comprise a reinforcing filler or non-reinforcing filler or an appropriate mixture of both. Reinforcing fillers may be fumed silica, precipitated silica, hydrophobicized precipitated silica, hydrophobicized fumed silica, carbon black, titanium dioxide, ferric oxide, aluminum oxide, and other metal oxides. Non-reinforcing fillers may be calcium carbonate, diatomaceous earth, calcium silicate, zirconium silicate, talc, and bentonite. Fibrous materials such as asbestos, glass fibers, or organic fibers are also useful fillers. The amount of filler used in an RTV composition is selected as desired so as to not interfere with the purposes of the instant invention.

Component (E) comprises a condensation catalyst such as dialkyltincarboxylates, alkyl titanates, organosiloxy titanium compounds, and various other condensation catalysts known in the art.

In referring to an acetoxy, ketoximo, or alkoxy silicon sealant, applicants define such as a sealant having the general composition previously defined where the end groups of the organopolysiloxane component (A) are acetoxy, ketoximo, or alkoxy groups. By alkoxy groups applicants define alkoxy to include both alkyl-, aryl- and alkylaryl-substituted alkoxy groups.

EXAMPLE

A base acetoxy sealant formulation was prepared. For purposes of comparison, the formulation was split and half was treated with 0.30 % by weight di-iodomethyl-para-tolylsulfone. The base acetoxy sealant formulation contained 76.16% by weight silanol stopped silicone polymer, 10.66% by weight fumed silica that had been treated with octamethylcyclotetrasiloxane, 8.18% by weight of an M,D,T silicone fluid, 0.09% by weight of a silicone masterbatch which contained 15.0 wt. % aluminum stearate dispersed in a polydiorganosiloxane, and 3.90% by weight of a catalyst solution. The catalyst solution contained 27.1% by weight of di-tertiary-butoxy-diacetoxysilane, 72.3% by weight of methyltriacetoxysilane, and 0.6% by weight of dibutyltindilaurate. After curing for 7 days at 25° C. and 50% relative humidity the two sealant formulations were evaluated for their physical properties. Table I presents the cured and uncured physical properties of the two sealants.

TABLE I

| Physical Property Comparison of Acetoxy Sealants | | |
|---|---|---|
| Formulation | I | II |
| Wt. % di-iodomethyl-para-tolylsulfone | 0 | 0.30 |
| Uncured properties: | | |
| Application rate, g/min. | 152 | 150 |
| Tack free time, min. | 15 | 15 |
| Boeing flow, in. | 0.1 | 0.1 |
| Cured properties: | | |
| E-62 Adhesion, psi | 220 | 212 |
| Shore A hardness | 25 | 25 |
| Tensile, psi | 250 | 280 |
| % Elongation | 360 | 385 |

Table I demonstrates that incorporation of di-iodomethyl-para-tolylsulfone does not significantly alter the uncured properties of the sealant and significantly improves two cured properties, tensile strength and percent elongation.

Having described the invention, that which is claimed is:

1. A mildew resistant silicone composition comprising a sealant selected from the group consisting of acetoxy, ketoximo, and alkoxy sealants and di-iodomethyl-para-tolylsulfone in an amount ranging from about 0.01% by weight up to about 2.00% by weight whereby tensile strength and percent elongation are improved.

2. The silicone composition of claim 1 wherein the amount of di-iodomethyl-para-tolylsulfone ranges from about 0.01% by weight up to about 0.50% by weight whereby tensile strength and percent elongation are improved.

3. The silicone composition of claim 1 wherein the amount of di-iodomethyl-para-tolylsulfone ranges from about 0.10% by weight up to about 0.50% by weight whereby tensile strength and percent elongation are improved.

4. The sealant composition of claim 1 wherein the silicone is an alkoxy silicone further comprising di-iodomethyl-para-tolylsulfone in an amount ranging from about 0.01% by weight up to about 2.00% by weight whereby tensile strength and percent elongation are improved.

5. The sealant composition of claim 1 wherein the silicone is a ketoximo silicone further comprising di-iodomethyl-para-tolylsulfone in an amount ranging from about 0.01% by weight up to about 2.00% by weight whereby tensile strength and percent elongation are improved.

6. A mildew resistant silicone composition comprising a sealant selected from the group consisting of acetoxy, ketoximo, and alkoxy sealants and di-iodomethyl-para-tolylsulfone in an amount ranging from about 0.01% by weight up to about 2.00% by weight whereby the physical properties of the sealant are improved whereby tensile strength and percent elongation are improved.

7. The silicone composition of claim 6 wherein the di-iodomethyl-para-tolylsulfone ranges from about 0.01% by weight up to about 0.50% by weight whereby tensile strength and percent elongation are improved.

8. The silicone composition of claim 6 wherein the di-iodomethyl-para-tolylsulfone ranges from about 0.10% by weight up to about 0.50% by weight whereby tensile strength and percent elongation are improved.

9. The mildew resistant sealant composition of claim 6 wherein the silicone is an acetoxy silicone further comprising di-iodomethyl-para-tolylsulfone in an amount ranging from about 0.01% by weight up to about 2.00% by weight whereby tensile strength and percent elongation are improved.

10. A method for improving the physical properties of a mildew resistant silicone composition comprising a sealant selected from the group consisting of acetoxy, ketoximo, and alkoxy sealants comprising (a) preparing a sealant selected from the group consisting of acetoxy, ketoximo, and alkoxy sealants; and (b) adding di-iodomethyl-para-tolylsulfone in an amount ranging from about 0.01% by weight up to about 2.00% by weight whereby tensile strength and percent elongation are improved.

11. A method for sealing gaps in food contact surfaces comprising (a) applying a mildew resistant silicone sealant comprising:

(1) (A), an organopolysiloxane having the general formula

HO(RR'SiO)$_x$H wherein R and R' are substituted or unsubstituted monovalent hydrocarbon radicals and may be identical or different where x has a value such that the viscosity of the organopolysiloxane is about 1,000 to 200,000 centipoise at 25° C.;

(2) (B), an organosilicon compound having at least three hydrolyzable moieties per molecule comprising silicon compounds selected from the group consisting of $R_aSi(ON=CR_2)_{4-a}$;

$R_aSi(OR)_{4-a}$;

$R_aSi(OCOR)_{4-a}$ where R is the same as defined previously and a is 0 or 1, or their partial hydrolysis products;

$R_aSi(NRR')_{4-a}$ where R is the same as defined previously, R' is hydrogen or the same as R, and a is 0 or 1, or their partial hydrolysis products; and $$R_aSi(NCOR)_{4-a}\atop|\atop R$$

where R and R' are the same as defined previously, and a is 0 or 1, or their partial hydrolysis products; and that have at least three R$_2$NO— groups per molecule in an amount ranging from about 1 to about 15 parts by weight per weight of (A); and (3) (C), an additive component comprising di-iodomethyl-para-tolylsulfone in an amount ranging from about 0.01% by weight up to about 2.00% by weight based upon the total weight of the composition; to the surface to be sealed and (b) exposing said sealant to atmospheric moisture, thereby (c) curing said sealant whereby tensile strength and percent elongation are improved.

* * * * *